(12) United States Patent
Tanase et al.

(10) Patent No.: US 6,335,908 B1
(45) Date of Patent: Jan. 1, 2002

(54) MAGNETO OPTICAL RECORDING MEDIUM WITH MASK LAYER

(75) Inventors: Kenji Tanase; Morio Nakatani, both of Gifu (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/522,467

(22) Filed: Mar. 9, 2000

(30) Foreign Application Priority Data

| Mar. 12, 1999 | (JP) | 11-066873(P) |
| Mar. 29, 1999 | (JP) | 11-086819(P) |
| Mar. 31, 1999 | (JP) | 11-093143(P) |

(51) Int. Cl.$^7$ ............................................. G11B 11/00
(52) U.S. Cl. ..................................................... 369/13
(58) Field of Search ........................ 369/13, 14, 110.01, 369/116; 360/59, 114; 365/122; 428/64.3, 694 ML, 694 MM

(56) References Cited

U.S. PATENT DOCUMENTS

| 5,592,445 A | * | 1/1997 | Onagi | 369/13 |
| 6,030,716 A | * | 2/2000 | Izumi et al. | 428/694 ML |

FOREIGN PATENT DOCUMENTS

| JP | 7-110971 A | * | 4/1995 | 369/13 |
| JP | 8-180481 A | * | 7/1996 | 369/13 |

OTHER PUBLICATIONS

"Improvement of Readout Resolution of MSR Magneto–Optical Disk Using an In–Plane Magnetization Mask Layer," Junji Hirokane, (Nov. 1997), pp. 25–30.

"Feasibility Study of CAD–MSR with 7 Gbit/in$^2$," Yoshiteru Murakami et al., Journal of The Magnetics Society of Japan, vol. 23, Supplement, No. S1 (1999), pp. 181–184.

* cited by examiner

*Primary Examiner*—Tan Dinh
(74) *Attorney, Agent, or Firm*—Armstrong, Westerman, Hattori, McLeland & Naughton, LLP

(57) ABSTRACT

A magneto-optical recording medium includes a transparent substrate, an underlying layer, a reproducing layer, a mask layer, a recording layer, and a protection layer. Reproducing layer is an in-plane magnetization film at room temperature and is transformed into a perpendicular magnetization film at about 150° C. Mask layer is an in-plane magnetization film at room temperature and reaches the Curie temperature around 140° C. which is lower than the reproducing temperature. Only the region whose temperature has reached the Curie temperature is demagnetized, and the other region retains the in-plane magnetization. The width of region whose temperature reaches the Curie temperature is substantially equal to the shortest domain length of recording layer. The magnetic domain of recording layer is transferred to reproducing layer 3 through the demagnetized region of mask layer. The leakage magnetic field from the other region of magnetic domain is shielded by mask layer retaining the in-plane magnetization. As a result, if the recording density increases, each magnetic domain of recording layer can be accurately transformed to a reproducing layer and the transferred magnetic domain can be detected.

15 Claims, 17 Drawing Sheets

| Ar GAS FLOW (sccm) | 40 ~ 80 |
|---|---|
| PRESSURE (mTorr) | 3 ~ 10 |
| TARGET | GdFe |
| RF POWER (mW/cm$^2$) | 0.5 ~ 2.5 |
| SUBSTRATE TEMPERATURE (°C) | 20 ~ 80 |

FIG. 3

| Ar GAS FLOW (sccm) | 40 ~ 80 |
|---|---|
| PRESSURE (mTorr) | 3 ~ 10 |
| TARGET | GdFe, Al |
| RF POWER (mW/cm$^2$) | 0.5 ~ 2.5 |
| SUBSTRATE TEMPERATURE (°C) | 20 ~ 80 |

FIG. 10

| Ar GAS FLOW (sccm) | 40 ~ 80 |
|---|---|
| PRESSURE (mTorr) | 3 ~ 10 |
| TARGET | GdFe |
| DC POWER (W/cm$^2$) | 0.5 ~ 3.0 |
| SUBSTRATE TEMPERATURE (°C) | 20 ~ 80 |

| Ar GAS FLOW (sccm) | 40 ~ 80 |
|---|---|
| PRESSURE (mTorr) | 3 ~ 10 |
| TARGET | GdFeAl |
| DC POWER (W/cm²) | 0.5 ~ 3.0 |
| SUBSTRATE TEMPERATURE (°C) | 20 ~ 80 |

FIG. 18

| Ar GAS FLOW (sccm) | 40 ~ 80 |
|---|---|
| N₂ GAS FLOW (sccm) | 5 ~ 20 |
| PRESSURE (mTorr) | 3 ~ 10 |
| TARGET | SiN |
| DC POWER (W/cm²) | 2.5 ~ 4.0 |
| SUBSTRATE TEMPERATURE (°C) | 20 ~ 80 |

FIG. 19

| Ar GAS FLOW (sccm) | | 40 ~ 80 |
|---|---|---|
| PRESSURE (mTorr) | | 3 ~ 10 |
| TARGET | | Gd, FeCo |
| DC POWER (W/cm²) | Gd | 0.2 ~ 0.7 |
| | FeCo | 0.7 ~ 1.8 |
| SUBSTRATE TEMPERATURE (°C) | | 20 ~ 80 |

MAGNETO OPTICAL RECORDING MEDIUM WITH MASK LAYER

BACKGROUND OF THE INVENTION

1. Field of the Invention

The present invention relates to magneto-optical recording media, and more particularly, to a magneto-optical recording medium having a mask layer.

2. Description of the Background Art

The magneto-optical recording medium has attracted much attention as a rewritable and highly reliable recording medium with a high storage capacity and is underway to be reduced to practice as computer memory or the like. Recently, the magneto-optical recording medium with a storage capacity of 6.0 G bytes has been adopted as an AS-MO (Advanced Storage Magneto Optical Disk) standard and is coming into use. A signal is reproduced from such a high density magneto-optical recording medium by an MSR (Magnetically Induced Super Resolution) method, according to which a laser beam is irradiated to transfer a magnetic domain of the recording layer of the magneto-optical recording medium onto the reproducing layer, a detection window is formed at the reproducing layer so that only the transferred magnetic domain can be detected and the transferred magnetic domain is detected based on the formed detection window.

The magnetic domain expansion reproduction technique has been developed, according to which an alternate magnetic field is applied at the time of reproducing a signal from the magneto-optical recording medium and the signal is reproduced by expanding and transferring a magnetic domain of the recording layer onto the reproducing layer using the laser beam and alternate magnetic field, and a magneto-optical recording medium capable of recording and/or reproducing a signal of 14 G bytes using this technique has been proposed.

However, as the recording density increases, a plurality of magnetic domains may be transferred to the reproducing layer at the time of transferring a magnetic domain of the recording layer by irradiating a laser beam, which prevents accurate signal reproduction.

As the recording density increases, when a magnetic domain of the recording layer is transferred onto the reproducing layer by irradiating a laser beam, the direction of magnetization does not quickly change at boundary within the horizontal plane of the magnetic domain transferred to the recording layer and the transferred domain cannot be accurately detected. As the recording density increases, a plurality of magnetic domains to be transferred to the reproducing layer may exist within the diameter of a laser beam spot. As a result, signals cannot be accurately reproduced. These disadvantages are encountered by magneto-optical recording media which reproduce a signal by the MSR method and by the magnetic domain expansion reproduction.

Hirokane discloses a magneto-optical recording medium having a mask layer in "Improvement of Readout Resolution of MSR Magneto-Optical Disk Using an In-Plane Magnetization Mask Layer", a document by Institute of Electrical Engineers of Japan, Magnetics Society, (Nov. 18 to 19, 1997). However, in this magneto-optical recording medium, the recording layer is formed on the mask layer with a non-magnetic layer therebeteween rather than being directly formed on the mask layer.

SUMMARY OF THE INVENTION

It is one object of the present invention to provide a magneto-optical recording medium allowing each magnetic domain of the recording layer to be accurately transferred onto the reproducing layer even if the recording density increases, so that the transferred magnetic domain can be accurately detected.

According to the present invention, the magneto-optical recording medium includes a substrate, a reproducing layer, a mask layer and a recording layer. The reproducing layer is formed on the substrate. The mask layer is formed on the reproducing layer, and has a Curie temperature higher lower than a reproducing temperature at the time of irradiating a laser beam and higher than room temperature. The recording layer is directly formed on the mask layer.

In the magneto-optical recording medium, when a laser beam is irradiate, and the temperature is raised, the region of the mask layer within the spot diameter of the laser beam whose temperature has reached the Curie temperature is demagnetized. As a result, the leakage magnetic field of a magnetic domain of the recording layer reaches the reproducing layer through the demagnetized region, and the magnetic domain of the recording layer is transferred to the reproducing layer by magneto-static coupling through the demagnetized region. Also in this magneto-optical recording medium, the recording layer is directly formed on the mask layer, there is no intermediate layer of a non-magnetic material, so that magnetic domains can be accurately transferred from the recording layer to the reproducing layer.

The mask layer is preferably an in-plane magnetization film. Therefore, the region other than the demagnetized region has in-plane magnetization, and therefore the leakage magnetic field of the magnetic domain will not reach the reproducing layer through the mask layer, while conversely, the leakage magnetic field of the magnetic domain of the reproducing layer will not reach the recording layer through the mask layer. As a result, the magnetic domain transferred to the reproducing layer can be readily expanded by an externally applied alternate magnetic field, and a signal in the recording layer can be surely retained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a table showing another condition for forming a mask layer in the magneto-optical recording medium shown in FIG. 1.

FIG. 10 is a table showing a condition for forming a mask layer in a magneto-optical recording medium according to a second embodiment of the present invention.

FIG. 18 is a table for forming SiN used for a non-magnetic layer in the magneto-optical recording medium shown in FIG. 16.

FIG. 19 is a table for forming GdFeCo used for the reproducing layer in the magneto-optical recording medium shown in FIG. 16.

DESCRIPTION OF THE PREFERRED EMBODIMENTS

Figures 1, 2:
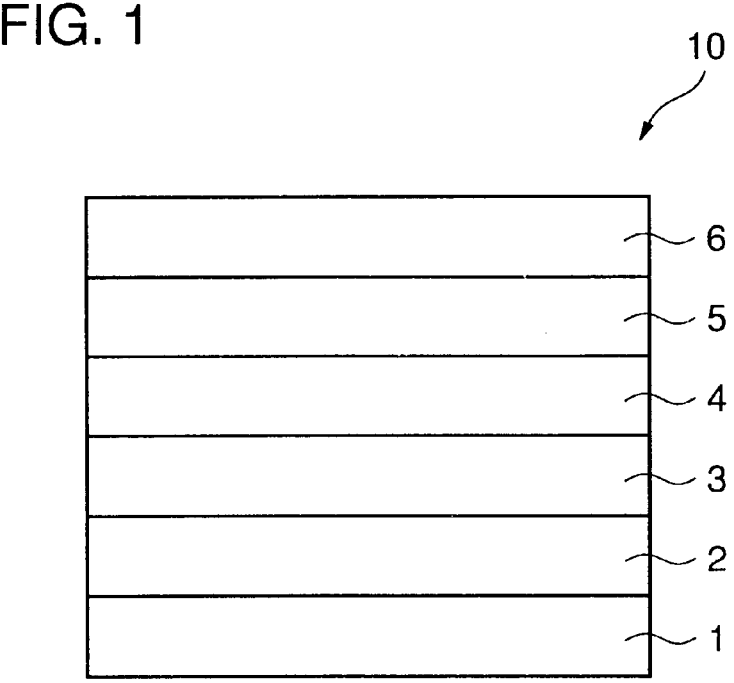
FIG. 1 is a cross sectional view of the structure of a magneto-optical recording medium according to a first embodiment of the present invention.
FIG. 2 is a table showing a condition for forming a mask layer in the magneto-optical recording medium shown in FIG. 1.

Embodiments of the present invention will be now described in conjunction with the accompanying drawings, in which the same or corresponding portions are denoted with the same reference characters and the description is not repeated.

First Embodiment

FIG. 1 is a cross sectional view of a magneto-optical recording medium according to a first embodiment of the present invention. Magneto-optical recording medium 10 includes a transparent substrate 1, a dielectric underlying layer 2 formed on transparent substrate 1, a reproducing layer 3 formed on underlying layer 2, a mask layer 4 formed on reproducing layer 3, a recording layer 5 formed on mask layer 4, and a dielectric protection layer 6 formed on recording layer 5.

Transparent substrate 1 is composed of a transparent material such as glass, polycarbonate resin or the like. Underlying layer 2 is composed of silicon nitride (SiN). Reproducing layer 3 is composed of GdFeCo. Mask layer 4 is composed of a magnetic material such as GdFe and GdFeAl. Recording layer 5 is composed of TbFeCo. Protection layer 6 is composed of SiN.

Underlying layer 2 is formed to prevent a magnetic layer such as GdFeCo from being degraded in quality to cause reduction in the recording and reproducing characteristics, which could be caused if the magnetic layer is directly formed on transparent substrate 1.

The GdFeCo layer forming reproducing layer 3 is an in-plane magnetization film at room temperature (approximately from 30° C. to 40° C.), and is transformed into a perpendicular magnetization film when the temperature is raised to 150° C. (the reproducing temperature) or higher with an irradiated laser beam.

The GdFe or GdFeAl layer forming mask layer 4 is also an in-plane magnetization layer at room temperature and is demagnetized at a temperature of about 140° C. (the Curie temperature) lower than the reproducing temperature for signals, i.e., 150° C. More specifically, mask layer 4 is a magnetic film which has magnetization in the in-plane direction at room temperature and is demagnetized at a temperature lower than the reproducing temperature.

The TbFeCo layer forming recording layer 5 is a perpendicular magnetization film. Protection layer 6 is provided to protect magnetic layers such as recording layer 5.

Underlying layer 2, reproducing layer 3, mask layer 4, recording layer 5 and protection layer 6 are formed by a DC magnetron sputtering method, and underlying layer 2 has a thickness in the range from 400 Å to 1000 Å, reproducing layer 3 in the range from 100 Å to 1000 Å4, mask layer 4 in the range from 50 Å to 700 Å, recording layer 5 in the range from 200 Å to 2000 Å, protection layer 6 in the range from 200 Å to 1000 Å. A typical thickness is 650 Å for underlying layer 2, 500 Å for reproducing layer 3, 200 Å for mask layer 4, 600 Å for recording layer 5, and 700 Å for protection layer 6.

SiN forming underlying layer 2, GdFeCo forming reproducing layer 3, TbFeCo forming recording layer 5 and SiN forming protection layer 6 may be formed under well known conditions.

Referring to FIGS. 2 and 3, conditions for forming mask layer 4 will be described. FIG. 2 is a table showing a condition for forming GdFe for mask layer 4. The target is GdFe, and the flow of Ar gas as a sputtering gas is in the range from 40 to 80 sccm, typically 60 sccm. The reaction pressure is in the range from 3 to 10 mTorr, typically 7 mTorr. The DC power is in the range from 0.5 to 2.5 mW/cm², typically 1.13 mW/cm². The substrate temperature is in the range from 20° C. to 80° C., typically 60° C.

FIG. 3 is a table showing a condition for forming GdFeAl for mask layer 4. In forming GdFeAl, an Al chip is placed on a GdFe target and then sputtered. The flow of Ar gas in this case is in the range from 40 to 80 sccm, typically 60 sccm. The reaction pressure is in the range from 3 to 10 mTorr, typically 7 mTorr. The DC power is in the range form 0.5 to 2.5 mW/cm², typically 1.13 mW/cm². The substrate temperature is in the range from 20° C. to 80° C., typically 60° C.

When mask layer 4 is formed under the conditions given in FIGS. 2 and 3, transparent substrate 1 is rotated at 33 rpm.

The magnetic material for mask layer 4 may be GdFeSi, GdFeBi, GdFeAg, GdFePt, GdFeAu, GdFPd or GdFeTi other than GdFe and GdFeAl. When any of these magnetic materials is formed, corresponding one of Si, Bi, Ag, Pt, Au, Pd and Ti chips is placed on a GdFe target and formed under the condition given in FIG. 3.

Figure 4:
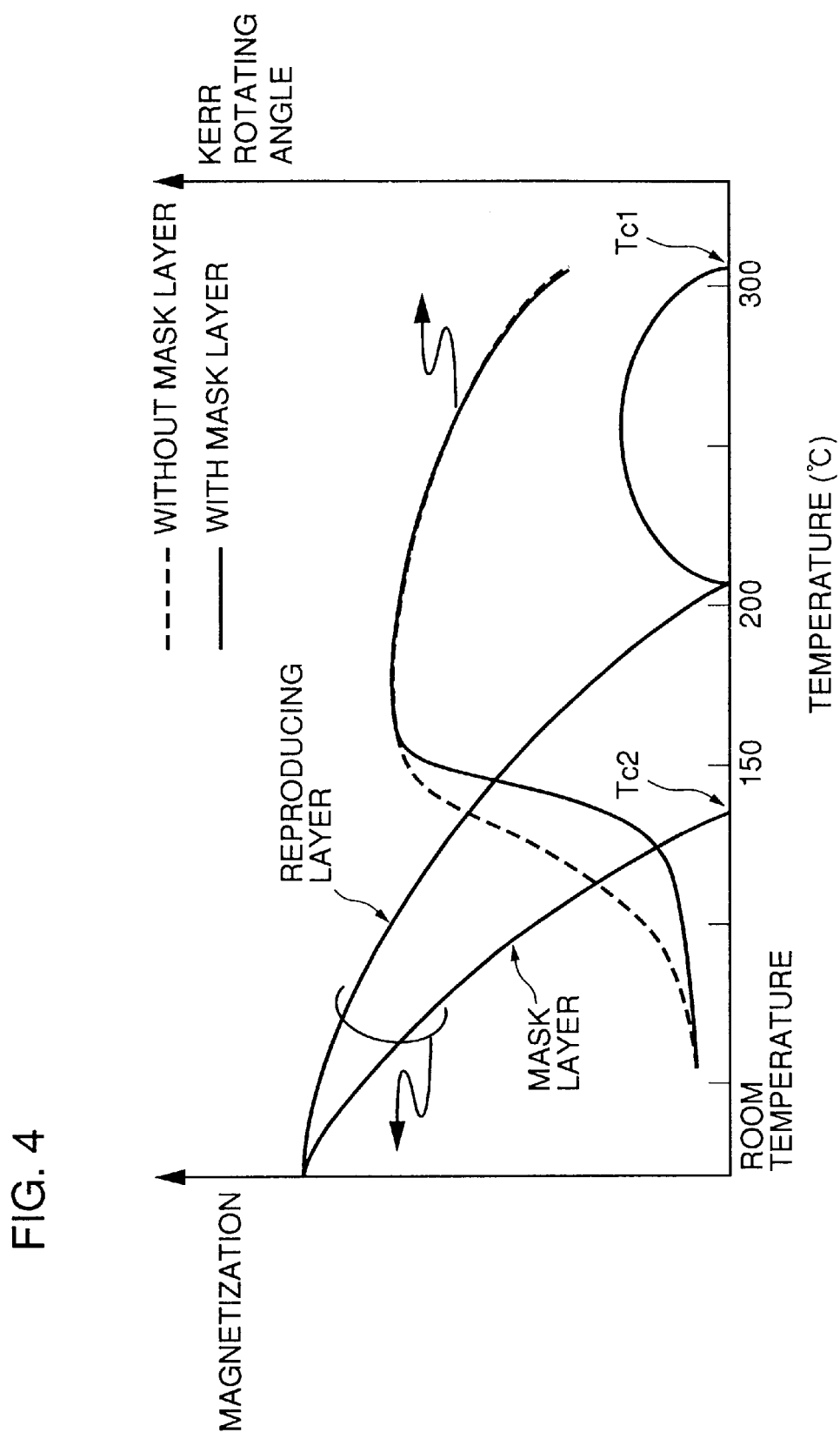
FIG. 4 is a graph showing the magnetic characteristic of a reproducing layer and the mask layer in the magneto-optical recording medium shown in FIG. 1.

Referring to FIG. 4, the magnetic characteristic of reproducing layer 3 and mask layer 4 in magneto-optical recording medium 10 according to the present invention will be described. The ordinate represents magnetization and the abscissa represents temperature. Reproducing layer 3 is an in-plane magnetization film at room temperature, and transformed into a perpendicular magnetization film when the temperature rises from room temperature and reaches a level of about 150° C. The Kerr rotation angle therefore increases in the vicinity of 150° C. At about 210° C., the magnetization is reversed, and at an elevated temperature of about 300° C., Curie temperature Tc1 is reached, so that the layer is demagnetized. Meanwhile, mask layer 4 which is an in-plane magnetization film at room temperature has its magnetization lowered as the temperature rises, and at about 140° C., Curie temperature Tc2 is reached, so that the layer is demagnetized.

Generally, when a laser beam is directed to a magneto-optical recording medium and a signal is reproduced, the temperature is at about 150° C. Therefore, when a laser beam is directed to magneto-optical recording medium 10 in order to reproduce a signal, the region of mask layer 4 whose temperature is not less than 140° C. is demagnetized, and the other region has magnetization in the in-plane direction.

Figure 5:
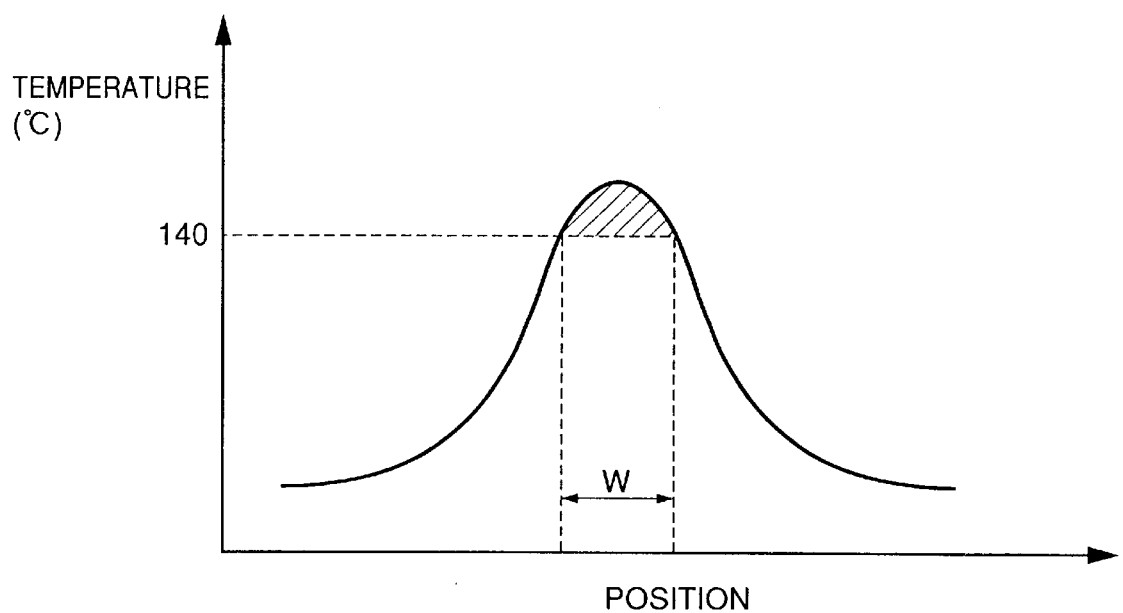
FIG. 5 is a graph for use in illustration of the relation between the intensity distribution of a laser beam and the region whose temperature is raised to 140° C. or higher.

Referring to FIG. 5, a laser beam typically has an intensity distribution represented in a Gaussian distribution, and when the laser beam having the distribution is directed to magneto-optical recording medium 10, the temperature of the region having a prescribed width W is raised to a level not less than 140° C. More specifically, the region of mask layer 4 having width W is demagnetized, and the other region has in-plane magnetization. According to the present invention, width W is substantially equal to the shortest domain length of recording layer 5.

When reproduction is performed at a linear velocity of 5 m/s, reproducing power is set to 1.2 to 3.0 mW, typically 2.0 mw, so that the region whose temperature is to be raised to a level not less than 140° C. may be 0.235 $\mu$m. Regarding the composition of mask layer 4 at the time, the content of Gd in GdFe is in the range from 13 to 27 at. %, typically 20 at. %, the content of Gd in GdFeAl is in the range from 5 to 27 at. %, typically 15 at. %. If mask layer 4 is of GdFeSi, GdFeBi, GdFeAg, GdFePt, GdFeAu, GdFePd or GdFeTi, Si, Bi, Ag, Pt, Pd or Ti is contained in about an equal percentage to Al.

Figure 6A:
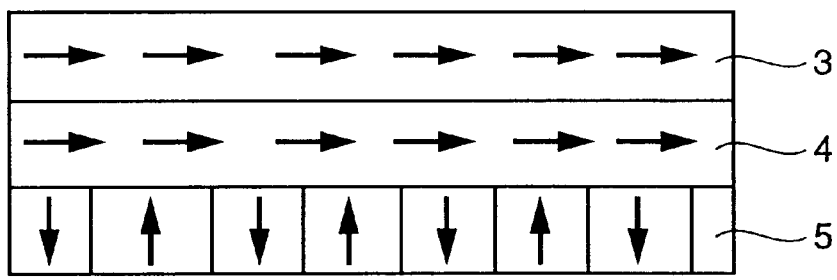
FIGS. 6A to 6C are diagrams for use in illustration of a method of reproducing the magneto-optical recording medium shown in FIG. 1 according to an MSR method.
Figure 6B:
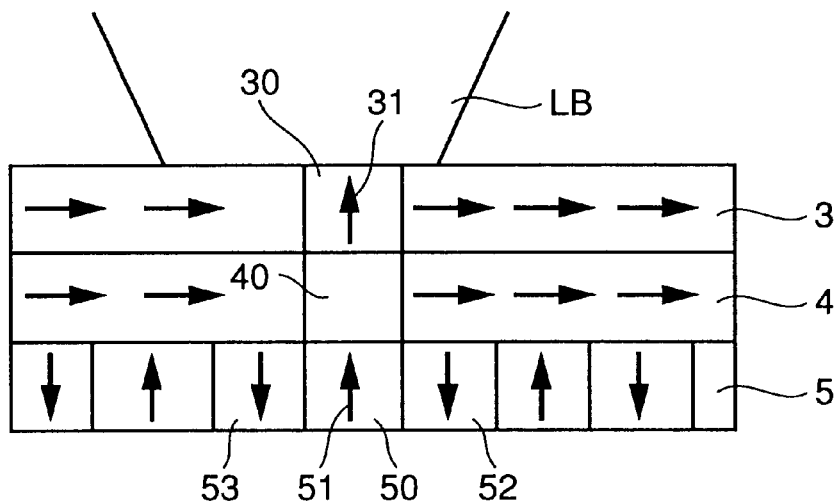
Figure 6C:
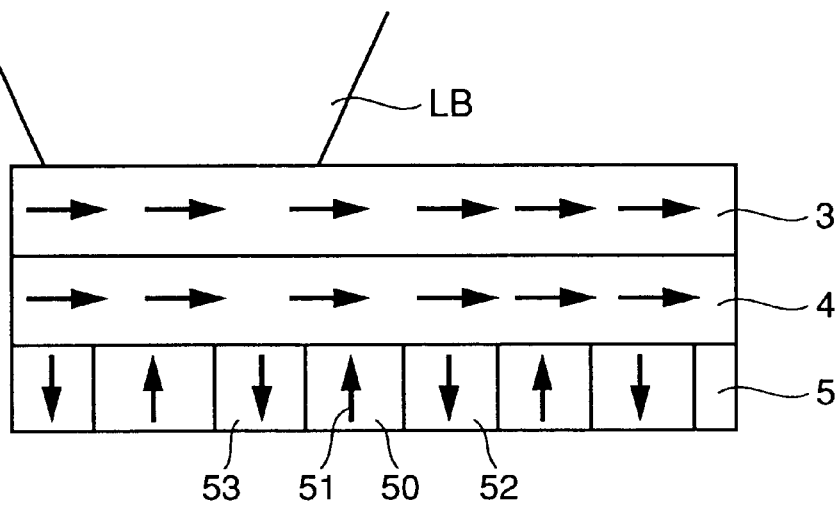

FIGS. 6A to 6C, a method of reproducing magneto-optical recording medium 10 will be described. Recording layer 5 having a signal recorded has perpendicular magnetization based on the signal, and mask layer 4 and reproducing layer 3 both have in-plane magnetization (see FIG. 6A).

When a laser beam LB is directed from the side of reproducing layer 3 in this state, only a region 40 of mask layer 4 in contact with a certain magnetic domain 50 has its temperature raised to 140° C. or higher, and region 40 is demagnetized. The region other than region 40 has in-plane magnetization. Thus, a leakage magnetic field from the magnetic domain 50 of recording layer 5 increases as the temperature rises, and reaches reproducing layer 3 through the demagnetized region 40. Reproducing layer 3 which is an in-plane magnetization film at room temperature is transformed into a perpendicular magnetization film at a temperature of 150° C. or higher. As a result, the magnetic domain 50 of recording layer 5 is transferred to reproducing layer 3 by magneto-static coupling, and a magnetic domain 30 having magnetization 31 in the same direction as that of magnetization 51 of magnetic domain 50 appears in reproducing layer 3 (see FIG. 6B).

In this case, leakage magnetic fields output from magnetic domains 52 and 53 on both sides of the magnetic domain 50 of recording layer 5 also increase, but the region of mask layer 4 in contact with magnetic domains 52 and 53 still holds the in-plane magnetization. The leakage magnetic fields of magnetic domains 52 and 53 therefore will not affect reproducing layer 3 and the magnetic domains 52 and 53 of recording layer 5 will not be transferred to reproducing layer 3 through mask layer 4. As described above in conjunction with FIG. 5, region 40 which is demagnetized when its temperature is raised to 140° C. or higher is substantially equal to the shortest domain length of recording layer 5.

The region of reproducing layer 3 other than magnetic domain 30 surely maintains the in-plane magnetization since the region of mask layer 4 other than region 40 has the in-plane magnetization. As a result, as compared to the case where no mask layer is provided as shown in FIG. 4, the Kerr rotation angle abruptly increases in the vicinity of the reproducing temperature (150° C.) when mask layer 4 is provided.

Therefore, two or more magnetic domains will not be transferred to reproducing layer 3 from recording layer 5, and each magnetic domain of recording layer 5 can be accurately transferred to recording layer 3. In particular, since recording layer 5 is directly formed on mask layer 4, leakage magnetic fields from magnetic domains 52 and 53 can be almost completely shielded, while a leakage magnetic field from magnetic domain 51 surely reaches reproducing layer 3.

Magnetic domain 30 appearing at reproducing layer 3 interacts with irradiated laser beam LB, and the reflected light of laser beam LB has its polarizing plane rotated by a prescribed angle by the magnetization 31 of magnetic domain 30, so that the reflected light having its polarizing plane rotated is detected to detect magnetic domain 30 as a signal. Since magnetic domain 30 has been formed by transferring the magnetic domain 50 of recording layer 5, detecting magnetic domain 30 means detecting magnetic domain 50.

Once magnetic domain 50 is detected and laser beam LB moves, the magnetic domain 30 of reproducing layer 3, the region 40 of mask layer 4 and the region of magnetic domain 50 of recording layer 5 are lowered in temperature, and magnetic domain 30 has its state transformed from perpendicular magnetization to in-plane magnetization, so that the region 40 of mask layer 4 has in-plane magnetization (see FIG. 6C). As a result, the initial state is regained (see FIG. 6A).

Through the process from FIGS. 6A to 6C as described above, each magnetic domain of recording layer 5 is transferred to reproducing layer 3 and a signal is reproduced.

Figure 7A:
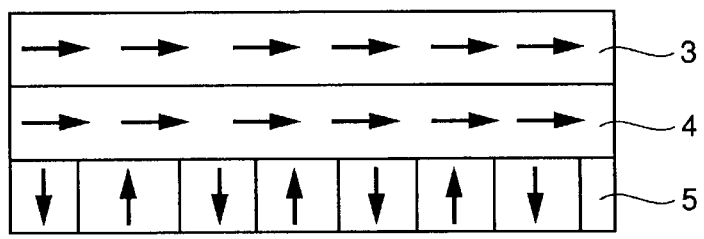
FIGS. 7A to 7D are diagrams for use in illustration of a method of reproducing the magneto-optical recording medium shown in FIG. 1 by magnetic domain expansion.
Figure 7B:
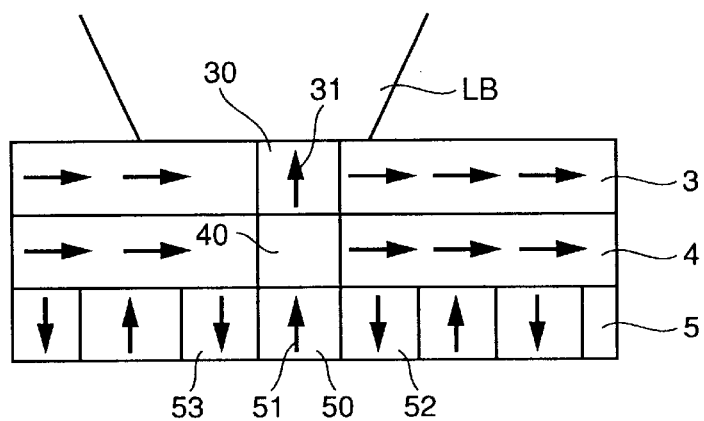
Figure 7C:
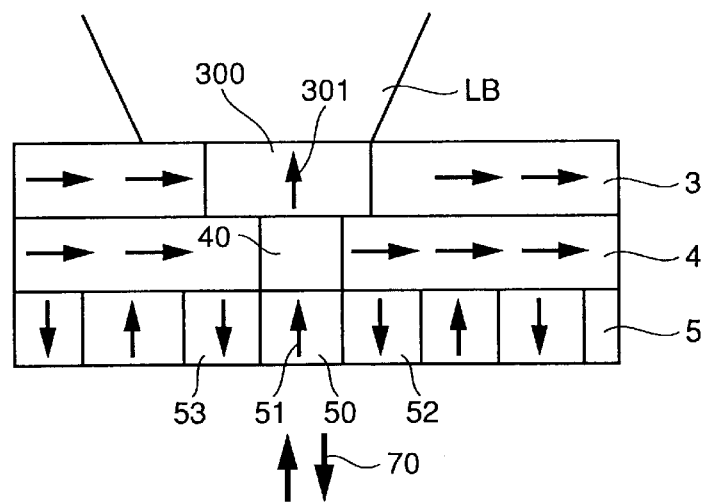

Magneto-optical recording medium 10 may be used not only as a magneto-optical recording medium for signal reproducing by the MSR method, but also as a magneto-optical recording medium for signal reproducing by magnetic domain expansion. The latter reproducing method will be described in conjunction with FIGS. 7A to 7D. FIGS. 7A and 7B are identical to FIGS. 6A and 6B in the above description, the description is not provided. The magnetic domain 50 of recording layer 5 is transferred to reproducing layer 3 through the region 40 of mask layer 4, and when an alternate magnetic field 70 is applied in the timing in which magnetic domain 30 appears at reproducing layer 3, magnetic domain 30 is expanded into a magnetic domain 300 in the timing in which the magnetic field in the direction the same as that of the magnetization 31 of magnetic domain 30 is applied (see FIG. 7C). In this case, since the region of mask layer 4 other than region 40 retains the in-plane magnetization, and leakage magnetic fields from magnetic domains 52 and 53 on both sides of magnetic domain 50 will not affect reproducing layer 3, magnetic domain 30 can be easily expanded into magnetic domain 300 by the applied external magnetic field.

Magnetic domain 300 thus expanded interacts with laser beam LB, and the reflected light of laser beam LB has its polarizing plane rotated by the magnetization 301 of magnetic domain 300. Therefore, the reflected light whose polarizing plane is rotated is detected to detect magnetic domain 300. In this case, magnetic domain 300 is larger than magnetic domain 30, the reflected light of the laser beam has its polarizing plane significantly rotated by magnetic domain 300 and the detected signal will have a larger amplitude.

Figure 7D:
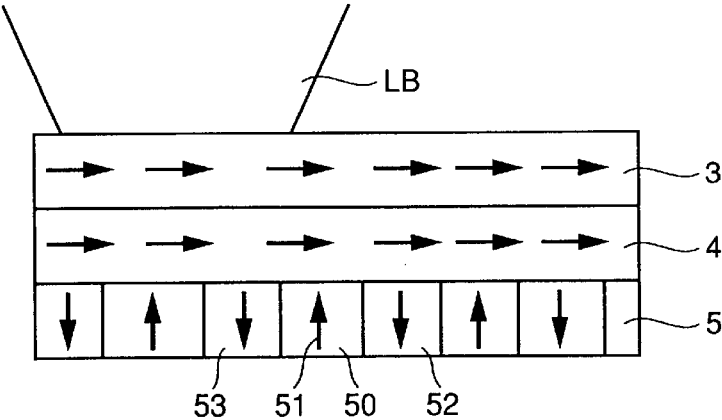

After magnetic domain 300 is detected, when an external magnetic field in the opposite direction to the magnetization 301 of magnetic domain 300 is applied, and laser beam LB moves so that the temperature is lowered, magnetic domain 300 has in-plane magnetization, and the in-plane magnetization appears in the region 40 of mask layer 4 (see FIG. 7D). As a result, the initial state is regained (FIG. 7A).

Through the process as described above and shown in FIGS. 7A to 7D, each magnetic domain of recording layer 5 is accurately expanded and transferred to reproducing layer 3 and a signal is reproduced.

The cross sectional structure of a magneto-optical recording medium according to the present invention is not limited to FIG. 1, and may be the structure having a non-magnetic layer inserted between mask layer 4 and reproducing layer 3 in FIG. 1.

Figure 8:
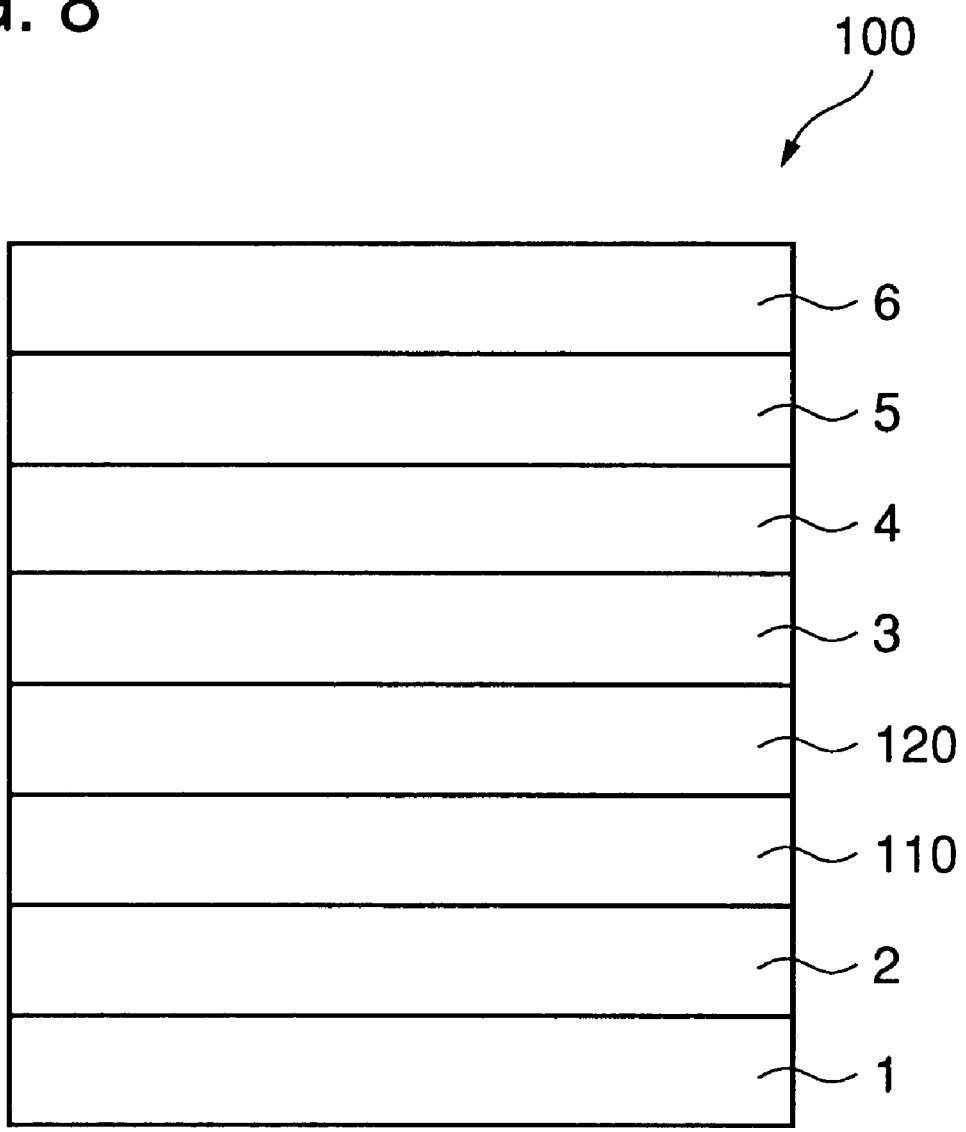
FIG. 8 is a cross sectional view of a variation of the magneto-optical recording medium shown in FIG. 1.

As described above, magneto-optical recording medium 10 as shown in FIG. 1 may be used as a medium for signal reproducing by magnetic domain expansion, while magneto-optical recording medium 100 in FIG. 8 is more suitable as a medium for signal reproducing by magnetic domain expansion.

Magneto-optical recording medium 100 is formed by inserting an expansion reproducing layer 110 and a non-magnetic layer 120 between the dielectric layer 2 and reproducing layer 3 of magneto-optical recording medium 10 in FIG. 1. Magnetic domain expansion reproducing layer 110 is composed of GdFeCo, while non-magnetic layer 120 is composed of SiN. These materials may be formed by a DC magnetron sputtering method.

In magneto-optical recording medium 100, the thickness of expansion reproducing layer 110 is in the range from 150 Å to 500 Å, while the thickness of non-magnetic layer 120 is in the range from 50 Å to 300 Å.

Figure 9A:
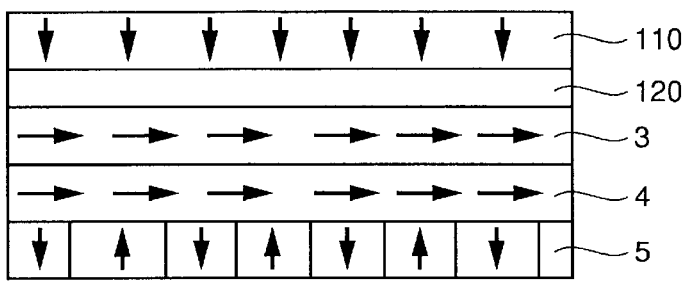
FIGS. 9A to 9D are diagrams for use in illustration of a method of reproducing the magneto-optical recording medium shown in FIG. 8.
Figure 9B:
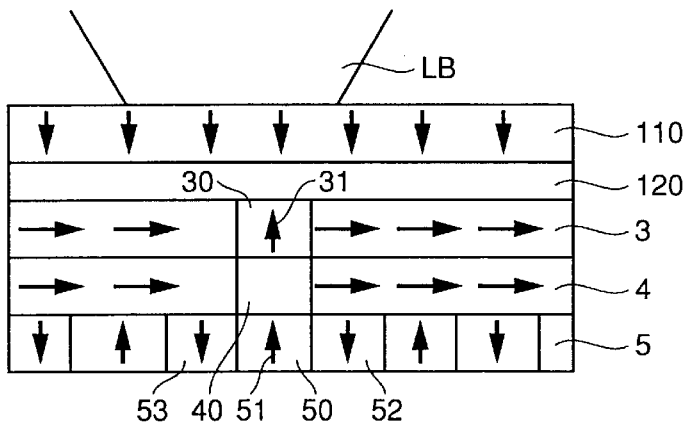
Figure 9C:
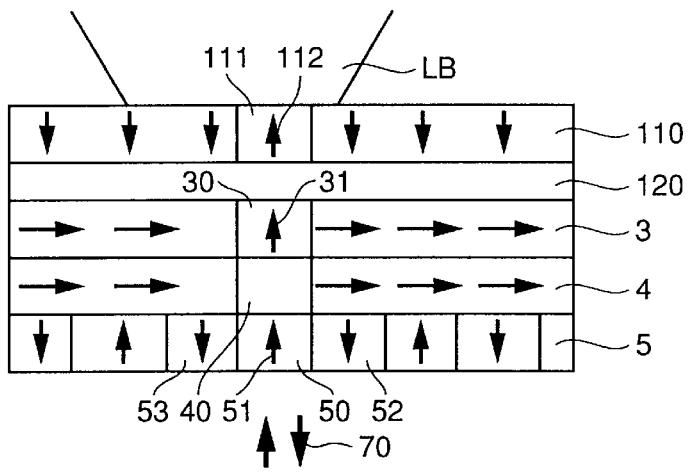
Figure 9D:
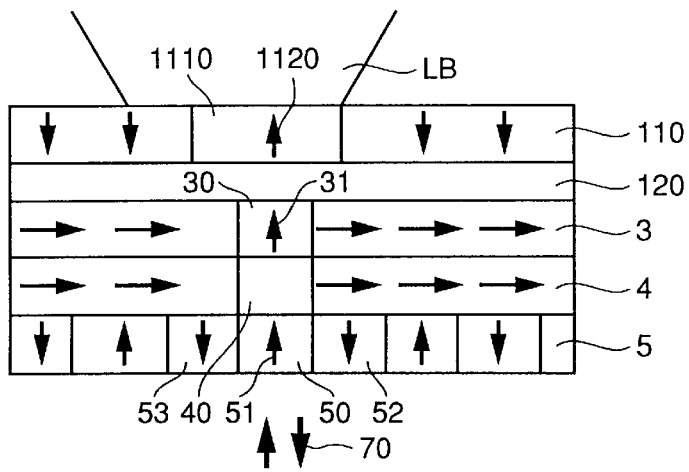

Referring to FIGS. 9A to 9D, a method of reproducing magneto-optical recording medium 100 will be described. FIGS. 9A and 9B are identical to FIGS. 7A and 7B, and therefore the description is not provided. After the magnetic domain 50 of recording layer 5 is transferred to reproducing layer 3 as magnetic domain 30, magnetic domain 30 is transferred to expansion reproducing layer 110 by magneto-static coupling through non-magnetic layer 120, and a magnetic domain 111 having magnetization 112 in the same direction as that of magnetization 31 of magnetic domain 30 appears at expansion reproducing layer 110 (see FIG. 9C). Then, when an alternate magnetic field 70 is applied, magnetic domain 111 is expanded into magnetic domain 1110 in the same timing in which the magnetic field in the same direction as that of magnetization 112 of magnetic domain 111 is applied (see FIG. 7D). In this case, the region of mask layer 4 other than region 40 retains in-plane magnetization, leakage magnetic fields from magnetic domains 52 and 53 on both sides of magnetic domain 50 will not affect expansion reproducing layer 110, and therefore magnetic domain 111 is easily expanded into magnetic domain 1110 by the external magnetic field. Magnetic domain 1110 thus expanded interacts with laser beam LB, and has its polarizing plane rotated by the magnetization 1120 of magnetic domain 1110. Therefore, the reflected light having its polarizing plane rotated can be detected to detect magnetic domain 1110. In this case, since magnetic domain 1110 is larger than magnetic domain 111, the reflected light of the laser beam has its polarizing plane significantly rotated by magnetic domain 1110, and a detected signal will have a large amplitude.

After magnetic domain 1110 is detected, an external magnetic field in the opposite direction to the magnetization 1120 of magnetic domain 1110 is applied, and when laser beam moves and the temperature is lowered, magnetic domain 1110 has perpendicular magnetization in the same direction as the initial magnetization, and in-plane magnetization appears in the region 40 of mask layer 4. As a result, the initial state (FIG. 9A) is regained.

Through the process as described above and shown in FIGS. 9A to 9D, each magnetic domain of recording layer 5 is accurately expanded and transferred to expansion reproducing layer 110 and a signal is reproduced.

In the above description, the expansion reproduction layer is a perpendicular magnetization film, but the invention is not limited this, and the layer may be a magnetic layer which takes the form of an in-plane magnetization film at room temperature and a perpendicular magnetization film at a prescribed temperature and higher.

Second Embodiment

According to a second embodiment of the present invention, the thickness of underlying layer 2 is in the range from 300 to 1500 Å, the thickness of reproducing layer 3 is in the range from 200 to 600 Å, the thickness of mask layer 4 is in the range from 50 to 300 Å, and the thickness of protection layer 6 is about 800 Å.

GdFeCo forming reproducing layer 3 is transformed from an in-plane magnetization film to a perpendicular magnetization film at a raised temperature of 50° C. or higher, GdFe or GdFeal is demagnetized at a temperature of about 140° C. lower than 150° C., the reproducing temperature for a signal, and retains the in-plane magnetization at a temperature of 140° C. or lower. In this case, reproducing layer 3 is in contact with mask layer 4, and therefore GdFeCo forming reproducing layer 3 retains the in-plane magnetization up to 140° C. by exchange coupling with GdFe or GdFeAl forming mask layer 4.

Referring to FIG. 10, a condition for forming GdFe used for mask layer 4 will be described. The DC power is in the range from 0.5 to 3.0 W/cm$^2$, typically 1.4 W/cm$^2$.

Figures 11, 12:
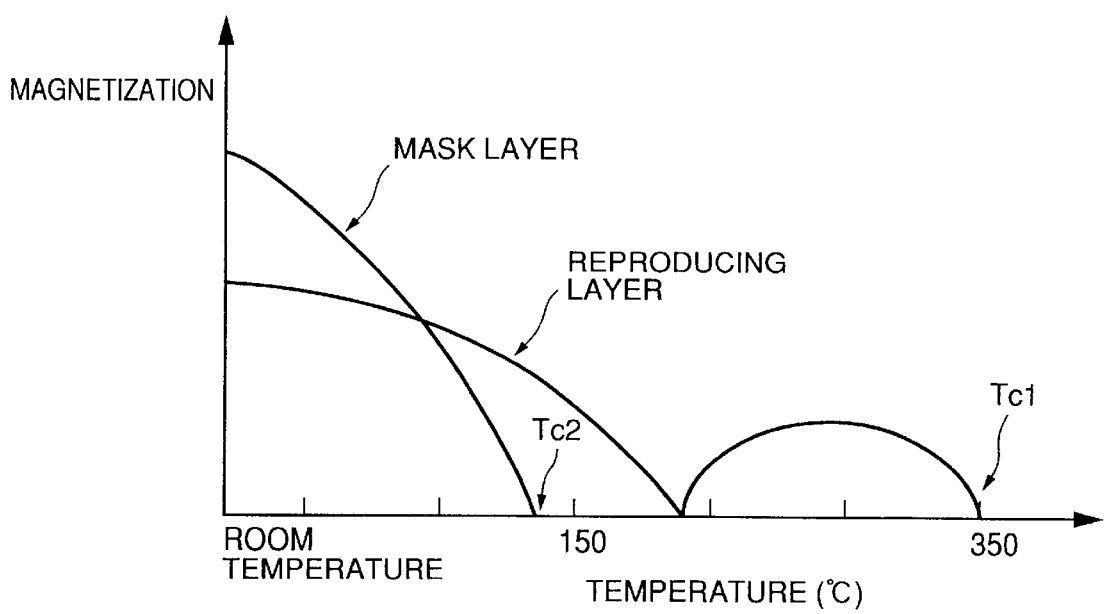
FIG. 11 is a table showing another condition for forming a mask layer in the magneto-optical recording medium according to the second embodiment.
FIG. 12 is a graph showing the magnetic characteristic of a reproducing layer and the mask layer in the magneto-optical recording medium according to the second embodiment.

FIG. 11 shows a condition for forming GdFeAl used for mask layer 4. The DC power is in the range from 0.5 to 3.0 W/cm$^2$, typically 1.4 W/cm$^2$.

Referring to FIG. 12, the magnetic characteristic of reproducing layer 3 and mask layer 4 according to the second embodiment will be now described. The ordinate represents magnetization, and the abscissa represents temperature. Recording layer 3 takes the form of an in-plane magnetization film at room temperature and is transformed into a perpendicular magnetization film when the temperature is raised from room temperature to about 50° C. or higher. When the temperature is further raised to 350° C. or higher, Curie temperature Tc1 is reached, and the layer is demagnetized. Meanwhile, mask layer 4 takes the form of an in-plane magnetization film at room temperature and has its magnetization weakened as the temperature rises. About at a level of 140° C. or higher, Curie temperature Tc2 is reached, and the layer is demagnetized. According to the second embodiment, reproducing layer 3 is in the state of exchange coupling with mask layer 4 which is an in-plane magnetization film and continues to be an in-plane magnetization film up to 140° C.

Also according to the second embodiment, as shown in FIG. 5, the width W of the region exceeding the Curie temperature (140° C.) is substantially equal to the shortest domain length of recording layer 5. If the storage capacity is 6 G bytes, the shortest domain length is 0.235 $\mu$m, and then, the content of Gd in GdFe or the content of Gd in GdFeAl is controlled such that the region whose temperature is raised to 140° C. or higher upon irradiation of a laser beam is as long as 235 $\mu$m. Similarly, if the storage capacity is 14 G bytes, the shortest domain length is 0.1 $\mu$m, and the content of Gd in GdFe or the content of Gd in GdFeAl is controlled such that the region whose temperature is raised to 140° C. or higher upon irradiation of a laser beam is as long as 0.1 $\mu$m.

In order to provide a magnetic material which is an in-plane magnetization film at room temperature and reaches the Curie temperature around 140° C., at a level lower than the reproducing temperature, the content of Gd in GdFe may be set in the range from 17 to 22 at. %, and the content of Gd in GdFeAl may be set in the range from 13 to 18 at. %.

Figure 13A:
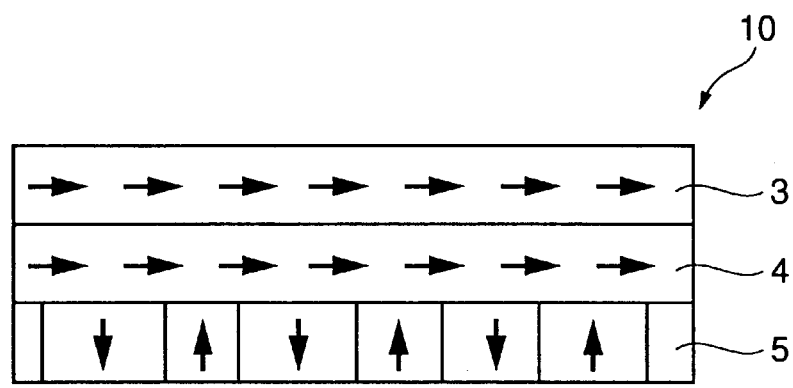
FIGS. 13A to 13C are diagrams for use in illustration of a method of reproducing the magneto-optical recording medium according to the second embodiment.
Figure 13B:
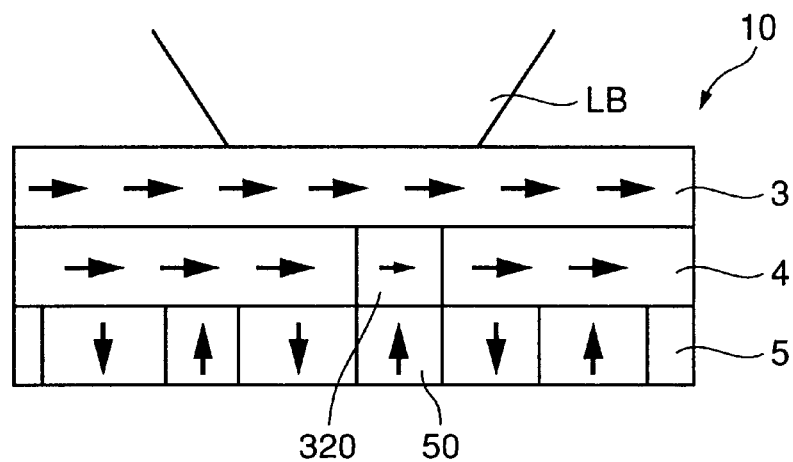
Figure 13C:
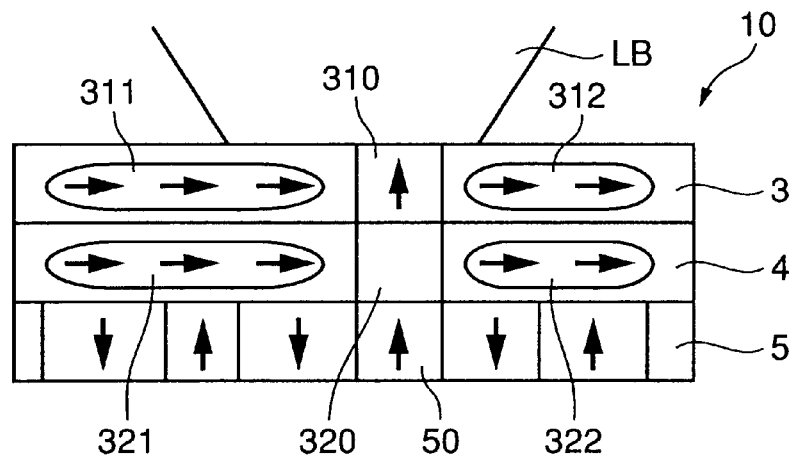

Referring to FIGS. 13A to 13C, a method of reproducing a signal according to the second embodiment will be described. When a signal is stored, recording layer 5 has perpendicular magnetization based on the signal, while reproducing layer 3 and mask layer 4 both have in-plane magnetization (see FIG. 13A).

In this state, a laser beam LB is irradiated from the side of reproducing layer 3, and at a raised temperature of 130° C., in recording layer 5, a region 320 of mask layer 4 adjacent to a certain magnetic domain 50 starts to be demagnetized, while the region other than region 320 retains its in-plane magnetization (see FIG. 13B). When the temperature of magneto-optical recording medium 10 is further raised to a level equal to or higher than 140° C., the leakage magnetic field from the magnetic domain 50 of recording layer 5 is intensified, the exchange coupling with mask layer 4 is disconnected, the region of reproducing layer 3 whose temperature is not less than 140° C. is transformed from an in-plane magnetization film to a perpendicular magnetization film, the magnetic domain 50 of recording layer 5 is transferred to reproducing layer 3 by magneto-static coupling through the demagnetized region 320 of mask layer 4, and a magnetic domain 310 appears in reproducing layer 3 (see FIG. 13C). The magnetic domains on both sides of the magnetic domain 50 of recording layer 5 are not transferred to reproducing layer 3 because the leakage magnetic field do not reach reproducing layer 3 because of in-plane magnetization 321 and 322 retained by both adjacent regions of mask layer 4.

Figure 14A:
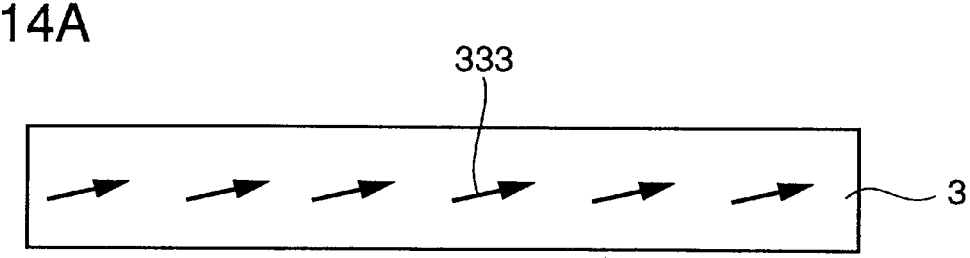
FIGS. 14A and 14B are diagrams showing the magnetic characteristic of the reproducing layer in the magneto-optical recording medium according to the second embodiment.
Figure 14B:
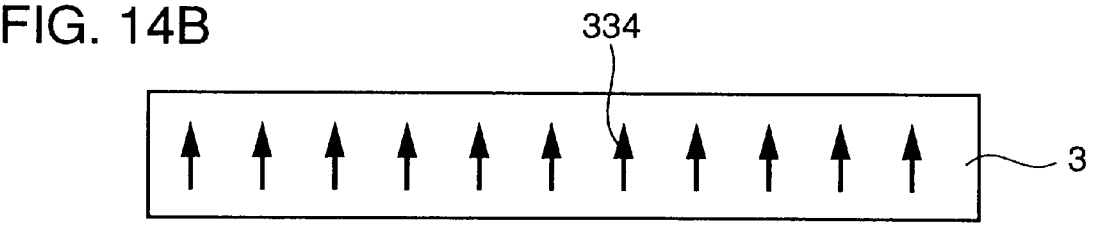
Figure 15:
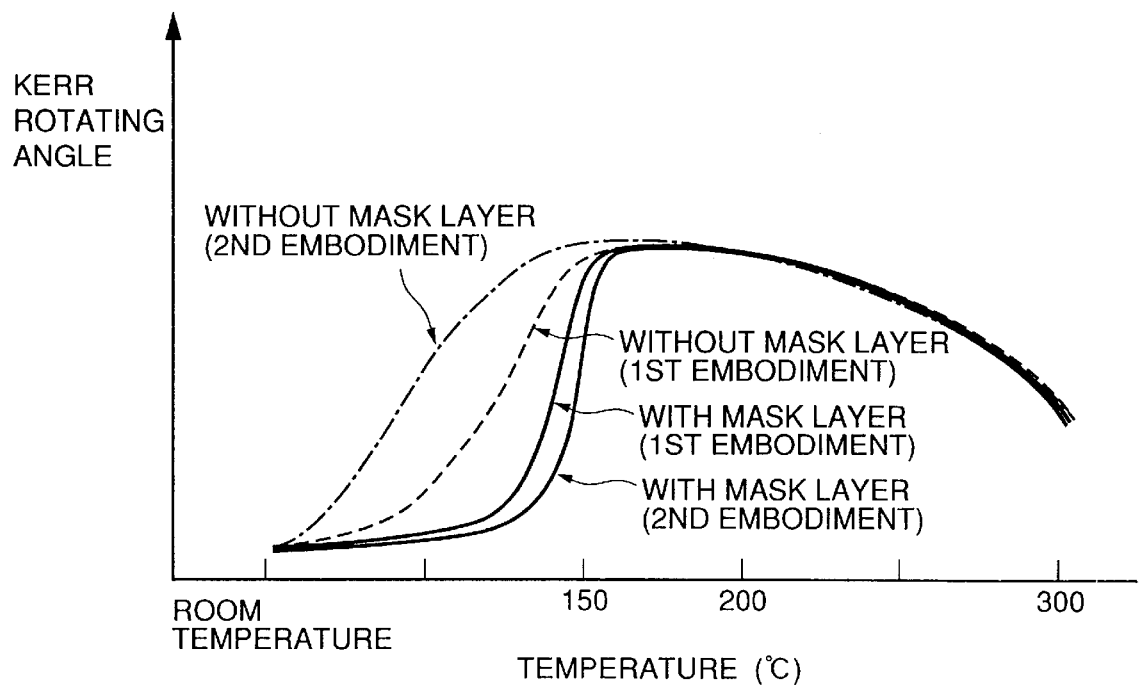
FIG. 15 is a graph showing change in the Kerr rotating angle relative to the temperatures in the first and second embodiments in comparison with a case without a mask layer.

Reproducing layer 3 by itself has magnetization 333 rotated in the direction perpendicular to the film plane from the direction horizontal to the film plane as shown in FIG. 4A at room temperature. Meanwhile, at about a temperature of 60° C., the layer has perpendicular magnetization 334 as shown in FIG. 14B. Therefore, if there in no mask layer 4, and a magnetic domain of recording layer 5 is transferred to reproducing layer 3, the magnetization does not change abruptly from the direction perpendicular to the film plane to the direction horizontal to the film plane at an end of the transferred magnetic domain. As a result, mask layer 4 is provided to provide the regions retaining in-plane magnetization 321 and 322 on both sides of the demagnetized region 320 of mask layer 4, so that the regions on both sides of magnetic domain 310 of reproducing layer 3 retain in-plane magnetization 311 and 312 in exchange coupling with inplane magnetization 321 and 322. As a result, the magnetization abruptly changes form the direction perpendicular to the film plane to the direction horizontal to the film plane at an end of the transferred magnetic domain 310, which is then clearly defined (see FIG. 13C). Therefore, as compared to the case without a mask layer as shown in FIG. 15, the use of mask layer 4 allows the Kerr rotating angle to abruptly change around 140° C.

In this case, the intensity of laser beam LB directed upon magneto-optical recording medium 10 is in the range from 1.0 to 3.0 mW, and the irradiation of laser beam LB having an intensity within the range permits the length of the demagnetized region 320 of mask layer 4 to be substantially equal to the shortest domain length of recording layer 5.

Third Embodiment

Figure 16:
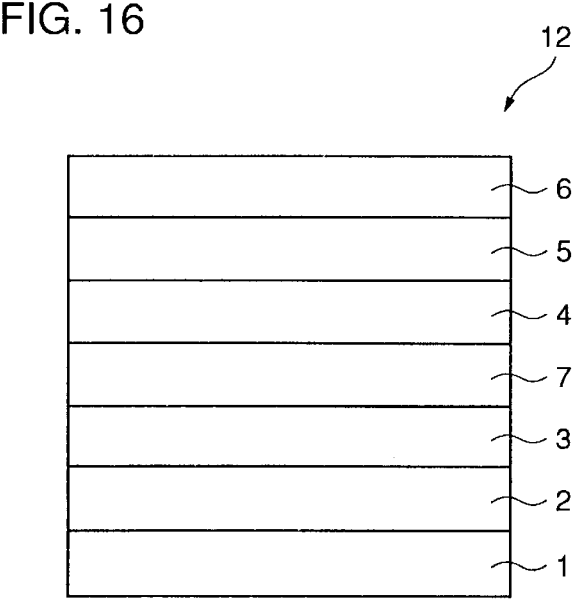
FIG. 16 is a cross sectional view of a magneto-optical recording medium according to a third embodiment of the present invention.

Referring to FIG. 16, a cross sectional structure of a magneto-optical recording medium according to a third embodiment of the present invention will be described. A magneto-optical recording medium 12 includes, in addition to the construction in FIG. 1, a non-magnetic layer 7 formed between reproducing layer 3 and mask layer 4.

Protection layer 6 is composed of ultraviolet curing resin.

According to the third embodiment, the thickness of underlying layer 2 is in the range from 350 to 1600 Å, the thickness of reproducing layer 3 is in the range from 150 to 800 Å, the thickness of non-magnetic layer 7 is in the range from 50 to 400 Å, the thickness of mask layer 4 is in the range from 50 to 400 Å, and the thickness of protection layer 6 is about 10 $\mu$m. The refractive index of reproducing layer 3 is higher than the refractive index of non-magnetic layer 7. SiN forming non-magnetic layer 7 is also formed by a sputtering method.

Figure 17:
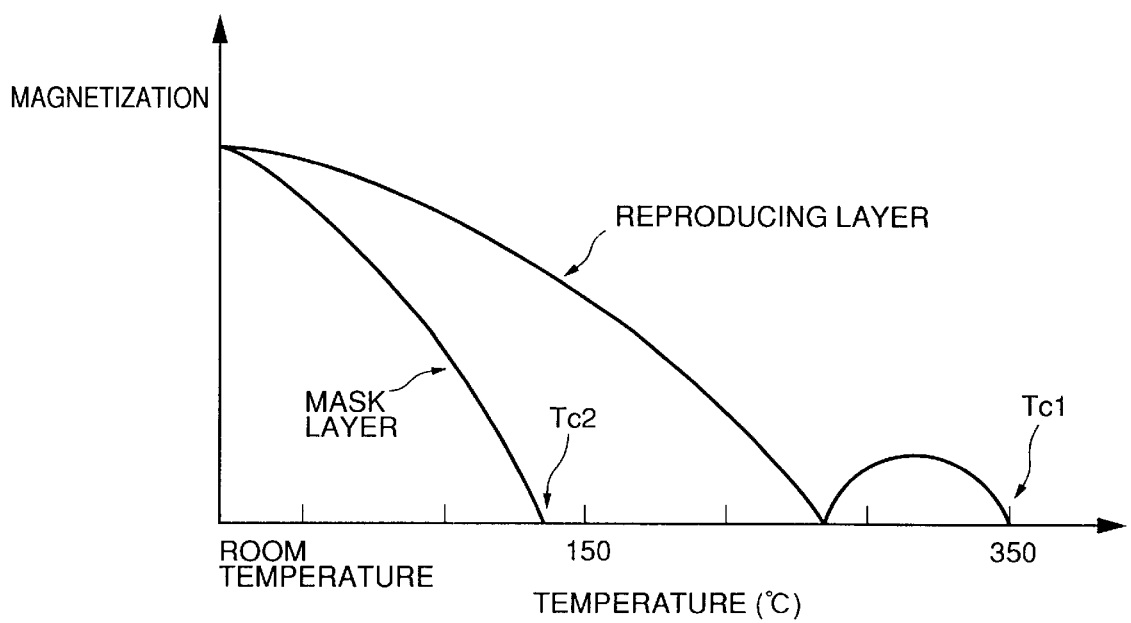
FIG. 17 is a graph showing the magnetic characteristic of a reproducing layer and a mask layer in the magneto-optical recording medium shown in FIG. 16.

Referring to FIG. 17, the magnetic characteristic of reproducing layer 3 and mask layer 4 in magneto-optical recording medium 12 will be described. The ordinate represents magnetization, and the abscissa represents temperature. Reproducing layer 3 is an in-plane magnetization film at room temperature and is transformed into a perpendicular magnetization film as the temperature rises above room temperature and reaches about 150° C. When the temperature further rises to about 350° C., Curie temperature Tc1 is reached, and magnetization is removed. Meanwhile, mask layer 4 is an in-plane magnetization film whose magnetization is weakened with temperature rise, and at about 140° C. where Curie temperature Tc2 is reached, the magnetization is removed.

Referring to FIG. 18, a condition for forming SiN for non-magnetic layer 7 will be described. The target is Si, the flow of Ar gas is in the range from 40 to 80 sccm, typically 60 sccm, the flow of $N_2$ gas is in the range from 5 to 20 sccm, typically 15 sccm. The reaction pressure is in the range from 3 to 10 mTorr, typically 7 mTorr. The DC power is in the range from 2.5 to 4.0 W/cm$^2$, typically 3.6 W/cm$^2$. The temperature of the substrate is in the range from 20 to 80° C., typically 60° C. The formation of SiN under the condition given in FIG. 18 permits SiN having a refractive index in the range from 1.8 to 2.5 to be formed.

Also, referring to FIG. 19, a condition for forming GdFeCo for reproducing layer 3 will be described. The target includes Gd and FeCo, the flow of Ar gas as a sputtering gas is in the range from 40 to 80 sccm, typically 60 sccm. The reaction pressure is in the range from 3 to 10 mTorr, typically 7 mTorr. Regarding the DC power, the power to be applied to the Gd target is in the range from 0.2 to 0.7 W/cm$^2$, typically 0.3 W/cm$^2$. The power to be applied to the FeCo target is in the range from 0.7 to 1.8 W/cm$^2$, typically 0.9 W/cm$^2$. The substrate temperature is in the range from 20 to 80° C., typically 60° C. The formation of GdFeCo under the condition given in FIG. 19 permits GdFeCo having a refractive index in the range from 2.5 to 3.5 to be formed.

According to the third embodiment, the difference between the refractive indexes of reproducing layer 3 and non-magnetic layer 7 is set large, so that the laser beam is reflected upon a number of positions, not only upon the surface of reproducing layer 3 but also upon the interface between reproducing layer 3 and non-magnetic layer 7, so that the apparent Kerr rotating angle reflected by magneto-optical recording medium 12 is increased to increase the amplitude of a reproducing signal.

Figure 20A:
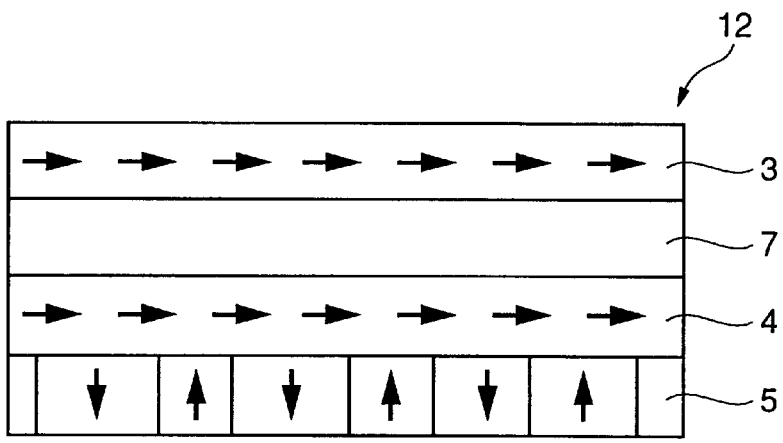
FIGS. 20A to 20C are diagrams for use in illustration of a method of reproducing the magneto-optical recording medium shown in FIG. 16 according to an MSR method.
Figure 20B:
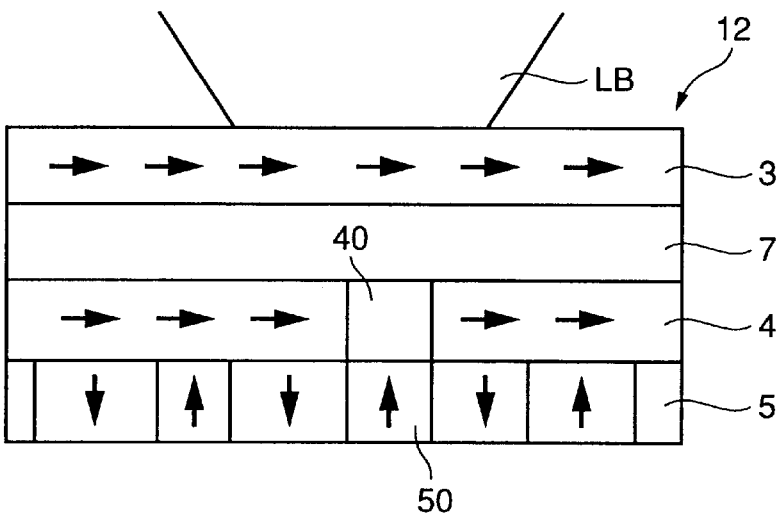
Figure 20C:
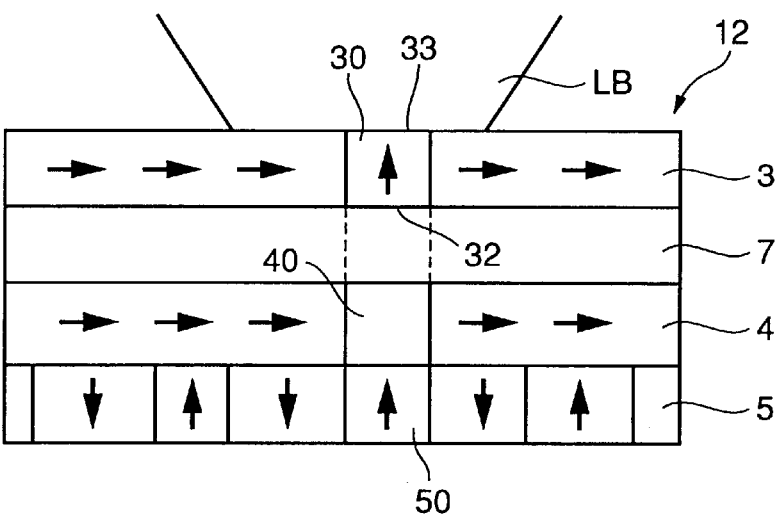

Referring to FIGS. 20A to 20C, a method of reproducing a signal from magneto-optical recording medium 12. When a signal is recorded, recording layer 5 has perpendicular magnetization based on the signal, and reproducing layer 3 and mask layer 4 both have in-plane magnetization (see FIG. 20A).

When laser beam LB is irradiated from the side of reproducing layer 3 in this state, in recording layer 5, the region 40 of mask layer 4 adjacent to magnetic domain 50 is demagnetized, and the region other than region 40 retains in-plane magnetization (see FIG. 20B). As the temperature of magneto-optical recording medium 12 rises, the leakage magnetic field from the magnetic domain 50 of recording layer 5 is intensified, magnetic domain 50 is transferred to reproducing layer 3 by magneto-static coupling through the demagnetized region 40 of mask layer 4 and non-magnetic layer 7, and magnetic domain 30 appears at reproducing layer 3 (see FIG. 20C). Magnetic domains on both sides of the magnetic domain 50 of recording layer 5 are not transferred to reproducing layer 3, because the adjacent regions of mask layer 4 retain the in-plane magnetization, and the leakage magnetic field does not reach reproducing layer 3.

Therefore, only the magnetic domain 50 of recording layer 5 is transferred to reproducing layer 3 through the demagnetized region 40 of mask layer 4 and non-magnetic layer 7.

The irradiated laser beam LB has its plane of polarization rotated by magnetic domain 30 transferred to reproducing layer 3 and is reflected, the reflection is detected to detect magnetic domain 30. In this case, the laser beam is reflected not only upon the surface 33 of reproducing layer 3 but also upon the interface between reproducing layer 3 and non-magnetic layer 7, so that the performance index determined by the Kerr rotating angle is increased and a reproducing signal having a large amplitude may be obtained.

In this case, the intensity of laser beam LB directed upon magneto-optical recording medium 12 is in the range from 1.3 to 3.0 mW, and the irradiation of laser beam LB having an intensity within this range permits the length of the demagnetized region 40 of mask layer 4 to be substantially equal to the shortest domain length of recording layer 5.

Figure 21A:
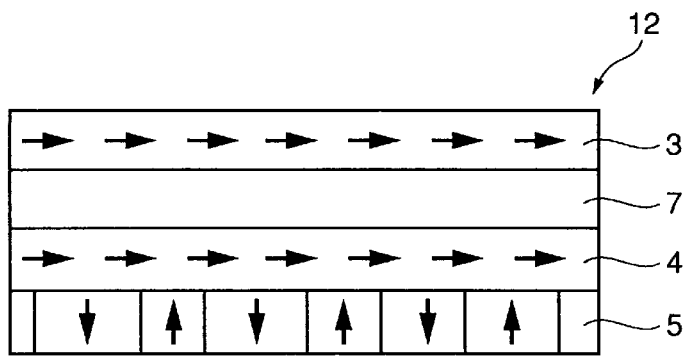
FIGS. 21A to 21D are diagrams for use in illustration of a method of reproducing the magneto-optical recording medium shown in FIG. 16 by magnetic domain expansion.
Figure 21B:
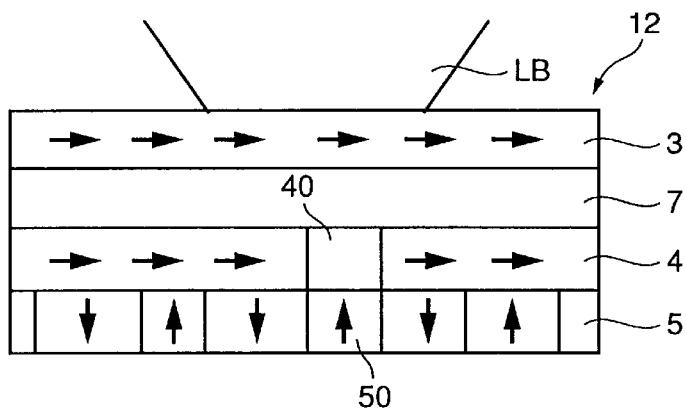
Figure 21C:
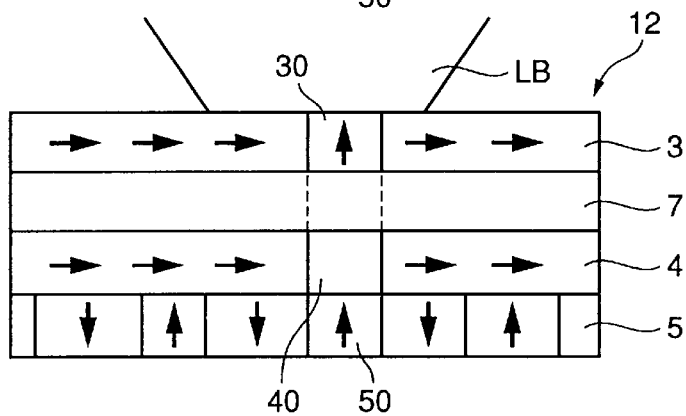
Figure 21D:
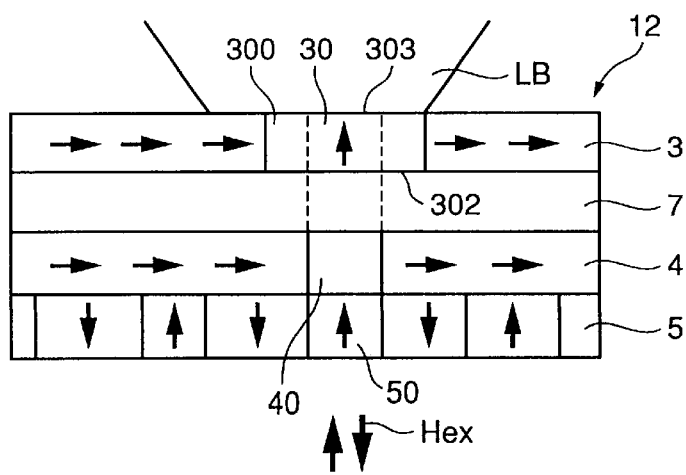

Magneto-optical recording medium 12 can be used not only as a magneto-optical recording medium for reproducing a signal by an MSR method, but also as a magneto-optical recording medium for reproducing a signal by magnetic domain expansion. A reproducing method in the case will be describe by referring to FIGS. 21A to 21D. FIGS. 21A to 21C are identical to FIGS. 20A to 20C, and therefore the description is not provided. The magnetic domain 50 of recording layer 5 is transferred to reproducing layer 3 through the demagnetized region 40 of mask layer 4 and nonmagnetic layer 7, and when an alternate magnetic field Hex is externally applied in the timing in which magnetic domain 30 has appeared at reproducing layer 3, magnetic domain 30 is expanded into magnetic domain 300 in the timing in which the magnetic field in the same direction as the magnetization of magnetic domain 30 is applied (see FIG. 21D). In this case, since the region other than the region 40 of mask layer 4 retains the in-plane magnetization, the leakage magnetic field from magnetic domains on both sides of magnetic domain 5 does not reach reproducing layer 3, so that magnetic domain 30 is readily expanded into magnetic domain 300 by the external magnetic field. The expanded magnetic domain 300 interacts with laser beam LB, the reflected light of which has its plane of polarization rotated by the magnetization of magnetic domain 300. Therefore, the reflected light having its plane of polarization rotated can be detected to detect magnetic domain 300. In this case, magnetic domain 300 is larger than magnetic domain 30, and therefore the reflection of the laser beam has its plane of polarization greatly rotated, and a detection signal with a greater amplitude results. In addition, laser beam LB is reflected not only upon the surface 30 of reproducing layer 3 but also upon the interface 302 between reproducing layer 3 and non-magnetic layer 7, so that the intensity of the laser beam to be detected further increases and a reproducing signal with a large amplitude results.

In the above description, the reproducing layer 3 of each of magneto-optical recording media 10 and 12 is a magnetic layer which is an in-plane magnetization film at room temperature and is transformed into a perpendicular magnetization film at a prescribed temperature or higher, but the invention is not limited to this, the layer may be a perpendicular magnetization film. If reproducing layer 3 is composed of a perpendicular magnetization film, TbFeCo is used, and the refractive index is set in the range from 2.5 to 3.5 as the above.

Furthermore, in the magnetic domain expansion reproduction according to which a laser beam is directed upon magneto-optical recording medium 12, and an alternate magnetic field is applied to transfer a magnetic domain of recording layer 5 to reproducing layer 3, the intensity of the laser beam to be directed is in the range from 0.5 to 2.5 mW, the intensity of the alternate magnetic field to be applied is ±300 Oe, and the frequency is 25 MHz.

The material of non-magnetic layer 7 is not only SiN but may also be any material having a refractive index smaller than the refractive index of the magnetic material used for reproducing layer 3.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical recording medium, comprising:

a substrate;

a reproducing layer formed on said substrate;

a mask layer formed on said reproducing layer and having a Curie temperature lower than a reproducing temperature at the time of irradiating a laser beam and higher than a room temperature; and a recording layer directly formed on said mask layer; wherein said reproducing layer is an in-plane magnetization film at said room temperature and is transformed into a perpendicular magnetization film around said reproducing temperature, and said mask layer is directly formed on said reproducing layer.

2. A magneto-optical recording medium, comprising:

a substrate;

a reproducing layer formed on said substrate;

a mask layer formed on said reproducing layer and having a Curie temperature lower than a reproducing temperature at the time of irradiating a laser beam and higher than a room temperature; and a recording layer directly formed on said mask layer; wherein the length of a region whose temperature exceeds the Curie temperature at the time of said laser beam irradiation in said mask layer is substantially equal to the shortest domain length.

3. A magneto-optical recording medium, comprising:

a substrate;

a reproducing layer formed on said substrate;

a mask layer formed on said reproducing layer and having a Curie temperature lower than a reproducing temperature at the time of irradiating a laser beam and higher than a room temperature;

a recording layer directly formed on said mask layer; and a non-magnetic layer formed between said reproducing layer and said mask layer, said reproducing layer having a refractive index higher than the refractive index of said non-magnetic layer.

4. The magneto-optical recording medium according to claim 1, wherein said mask layer is an in-plane magnetization film.

5. The magneto-optical recording medium according to claim 1, wherein said mask layer includes at least GdFe.

6. The magneto-optical recording medium according to claim 5, wherein said mask layer includes at least one selected from the group consisting of GdFe, GdFeAl, GdFeSi, GdFeBi, GdFeAg, GdFePt, GdFeAu, GdFePd and GdFeTi.

7. The magneto-optical recording medium according to claim 1, further comprising:

an expansion reproducing layer formed between said substrate and said reproducing layer; and a non-magnetic layer directly formed on said expansion reproducing layer, said reproducing layer being directly formed on said non-magnetic layer.

8. The magneto-optical recording medium according to claim 2, wherein said mask layer is an in-plane magnetization film.

9. The magneto-optical recording medium according to claim 2, wherein said mask layer includes at least GdFe.

10. The magneto-optical recording medium according to claim 9, wherein said mask layer includes at least one selected from the group consisting of GdFe, GdFeAl, GdFeSi, GdFeBi, GdFeAg, GdFePt, GdFeAu, GdFePd and GdFeTi.

11. The magneto-optical recording medium according to claim 2, further comprising:

an expansion reproducing layer formed between said substrate and said reproducing layer; and a non-magnetic layer directly formed on said expansion reproducing layer, said reproducing layer being directly formed on said non-magnetic layer.

12. The magneto-optical recording medium according to claim 3, wherein said mask layer is an in-plane magnetization film.

13. The magneto-optical recording medium according to claim 3, wherein said mask layer includes at least GdFe.

14. The magneto-optical recording medium according to claim 13, wherein said mask layer includes at least one selected from the group consisting of GdFe, GdFeAl, GdFeSi, GdFeBi, GdFeAg, GdFePt, GdFeAu, GdFePd and GdFeTi.

15. The magneto-optical recording medium according to claim 3, further comprising:

an expansion reproducing layer formed between said substrate and said reproducing layer; and a non-magnetic layer directly formed on said expansion reproducing layer, said reproducing layer being directly formed on said non-magnetic layer.

* * * * *